United States Patent [19]
Guyot et al.

[11] 4,186,404
[45] Jan. 29, 1980

[54] TRACING TABLE

[75] Inventors: Pierre Guyot, Franconville; Paul Delfau, Villiers le Bel; Robert Amaury, Gretz Armainvilliers, all of France

[73] Assignee: Ifelec, Société Anonyme, Courbevoie, France

[21] Appl. No.: 926,124

[22] Filed: Jul. 19, 1978

[30] Foreign Application Priority Data

Jul. 22, 1977 [FR] France ................................ 77 22637

[51] Int. Cl.² ............................................. G01D 9/28
[52] U.S. Cl. ........................................ 346/29; 346/49; 33/18 R
[58] Field of Search ................... 33/18 R, 32 R, 32 C, 33/1 M; 346/49, 29

[56] References Cited

U.S. PATENT DOCUMENTS

| | | | |
|---|---|---|---|
| 1,996,386 | 4/1935 | Owen | 33/32 C |
| 2,224,182 | 12/1940 | Crooke | 346/29 |
| 2,596,305 | 5/1952 | Stevens | 346/49 |
| 2,714,047 | 7/1955 | Dehmel | 346/8 |
| 3,196,446 | 7/1965 | Ingerson et al. | 346/29 |

*Primary Examiner*—John W. Shepperd

[57] ABSTRACT

This tracing table of the type having two tracing arms, namely an upper arm and a lower arm, has the upper arm mounted in a plane located above that of the lower arm, in relation to the tracing plane, and the upper arm, in addition to the pen lifting mechanism comprises a pen retraction mechanism adapted to retract the tracing pen of the upper arm up to a level higher that of the lower arm, so that the two arms can cross each other. Each arm may comprise two ink pens, and each pen of the upper arm is provided with a corresponding retraction mechanism.

9 Claims, 7 Drawing Figures

TRACING TABLE

BACKGROUND OF THE INVENTION

1. Field of the Invention

The present invention relates to a tracing table capable of simultaneously tracing two independent paths on a same tracing plane, of the type comprising:
 a tracing plane,
 two arms parallel to each other and to the tracing plane, these two arms being disposed on the same side of said tracing plane and movable in a direction X of the tracing plane while remaining parallel to a direction Y of said plane,
 a carriage movable along each arm,
 a tracing ink pen or scriber supported by each carriage,
 and a lifting mechanism associated with each ink pen and adapted to raise the relevant pen to a limited extent.

2. Description of the Prior Art

So-called 2X—2Y tracing tables are already known which are capable of tracing simultaneously two diagrams or charts of rectangular coordinates on a common support, the four variables deriving for example from a same phenomenon that can be observed.

On certains tables of this type, each diagram is traced by a pen carried by an arm. The dimension Y of a point of this diagram is defined by the position of the pen along the longitudinal axis of this arm, and the corresponding dimension X is defined by the position of the arm which is movable parallel to itself.

It is also possible to trace a diagram on each one of the two faces of the support, as disclosed in the French Pat. No. 2,237,538, but this arrangement involves certain servitudes in connection with the rigidity and transparency of the support.

If the two arms of the table are disposed on a same side and at a same level above the tracing plane, it is obvious that some contrivance has to be used when the two arms operate close to each other and are likely to interfere with each other.

The so-called "Auto-Reverse" or pen-exchange device is well known in the art. It comprises a mechanism capable of changing over the pen control means so that, after the change-over, the tracing of each diagram is assumed by the pen having previously made the other diagram. Of course, during the transfer operation the pen should be lifted by a pen-lifting mechanism which, in any case, must be provided, were it only for returning the pens to their initial or starting positions.

However, this pen exchange device is attended by the following shortcomings:

When the exchange is made for paths having very different $Y_1$ and $Y_2$ ordinates, one must wait until each pen has accomplished a relatively long travel along the axis of the arm supporting this particular pen before it can resume the tracing operation, and this causes a relatively considerable portion of the record to be lost irremediably.

The exchange should be started before the difference between the abscissae $X_2-X_1$ has become too small, to prevent the pens from meeting each other when the ordinates Y are exchanged. As a result, a relatively great exchange frequency is observed.

if the two paths have relatively close abscissae $X_1$ and $X_2$ during a certain time, exchanging the pens will prevent them from resuming the tracing operation due to the insufficiency in the new difference between the abscissae, and another exchange is started, thus causing the device to oscillate continuously.

If the electric means provided for controlling the exchange between the abscissae movements fail to operate for any reason, as far as the arm driving motors are concerned, or if this control action takes place with a certain delay, a shock will take place between the arms, and costly mechanical damages may result, especially if the table has relatively large dimensions affording relatively high-speed movements of the pen-supporting arms.

In case the two diagrams are to be traced with different colors, the possibility of substituting on each arm a pen of one color for a pen of another color should be preserved. Now this exchange frequently applies to two pens movable on two paths inclined to each other and crossing each other at the point of operation. As a result, the accuracy of the tracing will depend on the height of the arm above the tracing plane. On the other hand, this arrangement increases appreciably the hidden area about the diagram portion traced at a given time.

SUMMARY OF THE INVENTION

It is the essential object of the present invention to provide a tracing table capable of tracing simultaneously two independent paths on a same tracing plane, this tracing table being free of the above-listed inconveniences.

Another object of this invention is to improve the visibility of the traced lines during the tracing thereof, in order to enable an operator to exert any desired and necessary control action on the evolution of the phenomenon being observed.

For this purpose, the tracing table according to this invention is characterized in that one of the two arms, referred to herein as the upper arm, is movable in a plane overlying the other arm referred to herein as the lower arm, and that the upper arm, in addition to the lifting mechanism, carries a pen retraction mechanism capable of retracting the tracing pen of the upper arm to a level higher than the lower arm, so that the two arms can cross each other.

According to a preferred form of embodiment of the present invention, in which each arm is provided, in a manner known per se, with two tracing pen disposed in overhanging relationship on either side of the longitudinal axis of the arm, said table is further characterized in that the two pens are mounted on the carriage of the relevant arm and at the same ordinate, these two pens being not simultaneously in operation, and that each pen of the upper arm is carried by a corresponding retraction mechanism. Thus, the difference between the abscissae $X_1-X_2$ of the pens in operation may cancel itself or each change its sign without causing the exchange between pens to take place, provided that the quantity $[Y_1-Y_2]$ corresponding to the absolute value of the difference between the ordinates of the pens of each arm exceeds a minimum value still permitting the free movements of the pens in operation. The visibility of the lines being traced is also improved.

A tracing table structure comprising two pens per arm is disclosed on the other hand in the French Pat. No. 1,518,089, but this known arrangement cannot solve by itself the problem set forth hereinabove.

BRIEF DESCRIPTION OF THE DRAWINGS

Other objects and features characterizing this invention will appear as the following description proceeds with reference to the accompanying drawings, in which.

DESCRIPTION OF THE PREFERRED EMBODIMENT

Figure 2:
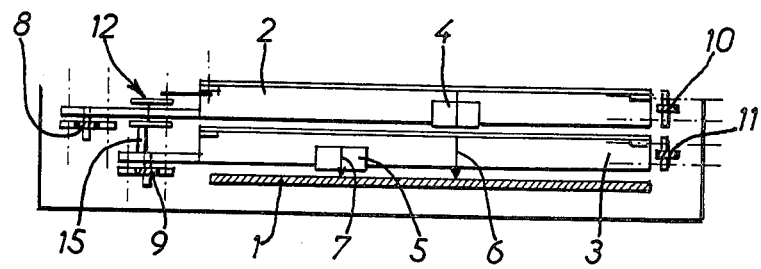
FIG. 2 is a diagrammatic cross-section of the same table.
Figure 1:
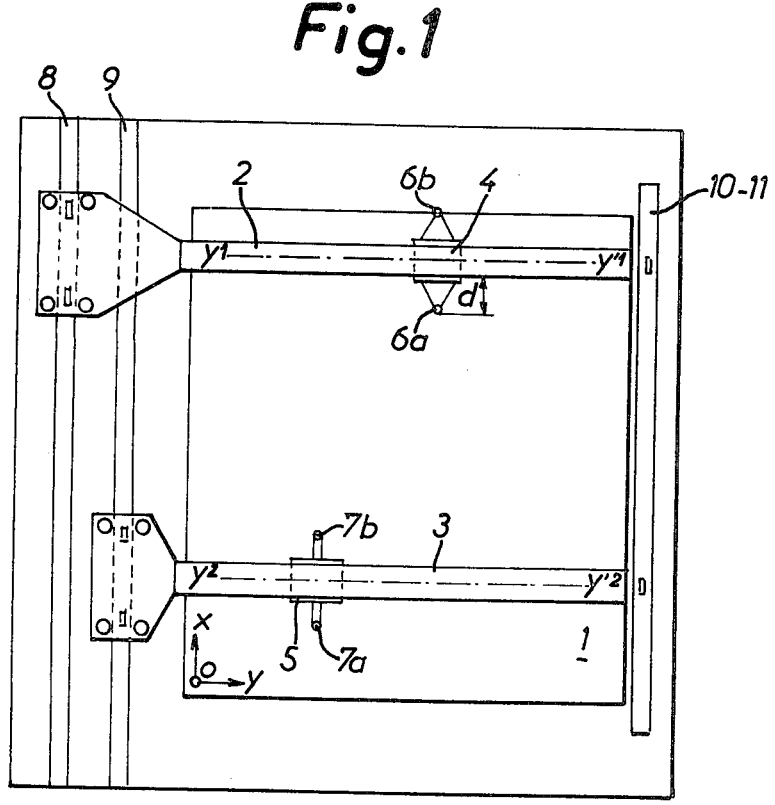
FIG. 1 is a diagrammatical elevational view of the tracing table according to a preferred form of embodiment of the invention.

Referring to FIGS. 1 and 2 of the drawings, the tracing plane 1 of a tracing table is shown together with a so-called upper arm 2 and so-called lower arm 3.

In FIG. 2, it will be seen that the lower arm 3 is located at a level between the level of the tracing plane 1 and that of the upper arm 2. The two arms can each move in a plane parallel to the tracing plane 1.

Mounted on the upper arm 2 is a carriage 4 adapted to travel along the longitudinal axis y1-y'1 of this arm and supporting a pair of tracing pens 6a and 6b disposed symmetrically on either side of said axis y1-y'1. Likewise mounted on the lower arm 3 is another carriage 5 movable along the longitudinal axis y2-y'2 of this arm and supporting a pair of tracing pens 7a and 7b disposed symmetrically on either side of the axis y2-y'2 of this arm 3.

The tracing plane 1 is marked with rectangular coordinates XOY, the coordinates axis OY being parallel to the axes y1-y'1 and y2-y'2 of the two arms. Moreover, these arms 2 and 3 are each movable along the abscissae axis OX. To this end, rollers carried by one end of the upper arm 2 roll on a guide rail 8 parallel to the abscissae axis OX, and other rollers carried by the lower arm 3 roll on another guide rail 9, also parallel to the abscissae axis OX. Preferably, the rail 8 is located beyond the rail 9 in relation to the tracing plane 1, in order to simplify the assembling operations. The end of each roller-supporting arm is preferably widened to a T-shape in order to ensure a proper parallel relationship between the axes of the arms 2, 3, on the one hand, and the OY axis, on the other hand.

The other end of the upper arm 2 also carries rollers engaging a guide rail 10. The same applies to the lower arm 3 engaging a guide rail 11. With this arrangement, each arm can be maintained at a constant distance above the plane 1.

Besides, both carriages 4 and 5 can move along the longitudinal axes of arms 2 and 3, and the latter can move in turn along the X-axis of the table under the control of drive motors, ropes or tapes, and the positions of the pens can be determined by means of potentiometers or similar devices in a manner known per se and not shown in the drawings.

Under normal operating conditions, as shown in FIG. 1, the ink pens 6a and 7b disposed between the two arms are lowered and the other ink pens 6b and 7a are lifted. These movements are controlled by separate electromagnets (not shown) disposed on the T-shaped ends of the two arms.

The ink pens 6a and 7b are each capable of tracing simultaneously a diagram or chart representing for instance the trajectory of a missile aimed at a target.

To improve the visibility of the tracing, it will be seen that the pens 6a and 6b project to a certain distance d from the body of the arm 2. The same applies to ink pens 7a and 7b. As a result, let $X_1$ be the abscissa of pen 6a in operation on the upper arm 2, and $X_2$ be the abscissa of the pen 7b in operation on the lower arm 3, the two diagrams may be traced while preserving the free movements of each pen even if the quantity $X_1-X_2$ is cancelled, or even has its sign changed while remaining greater than the $-d$ value, provided however that the quantity $Y_1-Y_2$ corresponding to the absolute value of the difference between the ordinates of the pens carried by each arm exceeds the minimal value still permitting the free movements of the pens and corresponding approximatively to the over-all dimensions of a pen.

If the quantity $X_1-X_2$ is small enough (while adhering to the above requirement) and if the quantity $Y_1-Y_2$ is so small that the above requirement cannot be met, it is only sufficient to actuate the pen lifting means associated with pen 6a up to a level sufficient to enable the raised pen 6a to clear the projecting portion of pen 7b, so as to prevent the pens from contacting each other.

If the above-mentioned requirement concerning the quantity $X_1-X_2$ is no more met, the invention provides a pen exchange device such that the following steps will take place in succession, in the case of FIG. 1:

lifting pens 6a and 7b in operation, retracting pen 6a of arm 2 upwards, the other pen 6b of this arm 2 being already retracted, moving each arm so that they cross each other, the lower arm 3 passing between the upper arm 2 and the tracing plane 1, each arm being so moved that the inoperative pen 6b becomes coincident with the abscissa of pen 6a, the same applying to pens 7a and 7b, pulling out pen 6b, and lowering pens 6b and 7a until they engage the tracing plane 1.

From the foregoing it is clear that a retraction may be considered as a complementary lifting movement of the corresponding pen.

Of course, the same sequence of steps as those described hereinabove but in the reverse order are required for resuming the initial configuration if another pen exchange is required.

In FIG. 2, it is clearly shown that the arm 3 can pass under the arm 2, provided that the pens 6a and 6b carried by this arm are retracted; the means permitting this retraction are described in a later part of this specification.

On the other hand, it will be seen that the retraction of pens 6a and 6b should be controlled as a function of the relative positions of arm 3 and arm 2. Thus, when the two arms are crossing each other, the two pens 6a and 6b should be retracted, and in actual service, when the two arms are sufficiently spaced from each other, if the arm 3 is on the left-hand side of arm 2, only the pen 6b should be retracted, and if the arm 3 is on the right-hand side of arm 2, only pen 6b should be retracted. This retraction control action may advantageously be obtained, for each pen 6, by using a memory mechanism 5 set during the passage of arm 3 above the arm 2 in a given direction and released during the passage of the same arm 3 in the other direction. The setting of this memory mechanism causes the corresponding pen 6 to be retracted, and the release of the same mechanism brings the retraction phase to an end and moves the same pen to its operative position.

Figure 3:
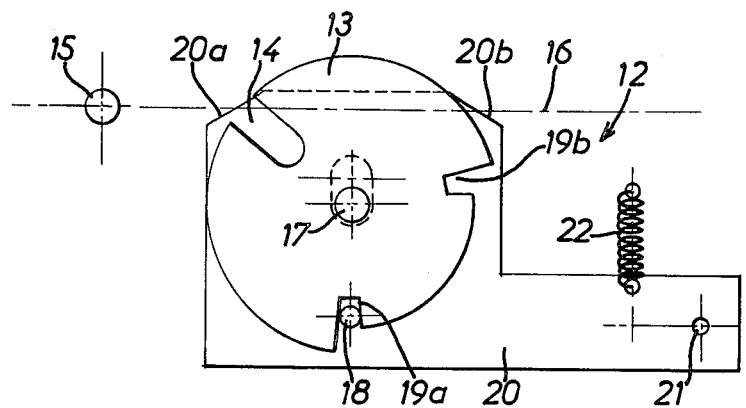
FIG. 3 illustrates a memory device actuated as a function of the relative position of the two arms.

This memory mechanism, illustrated diagrammatically at 12 in FIG. 3, is carried by the arm 2 adjacent the rail 8. It comprises a disk-type detent-positioning device comprising a disk 13 having a notch 14 formed in its outer periphery and adapted to be engaged by a dog 15 consisting of a cylindrical stud rigid with the arm 3.

This dog 15 is movable along a path 16 secant to the disk 13. When it engages the notch 14, the disk 13 is rotated through one fraction of a revolution about its pivot pin 17. To prevent the disk 13 from rotating when the dog 15 is disengaged from its notch 14, the angular position of the disk 13 is kept in a memory consisting simply of the engagement of a pin 18 into one of a pair of notches 19a, 19b of disk 13. The pin 18 is carried by a lock cam 20 adapted to pivot about a fulcrum pin 21. This cam is urged against the force of a spring 22 by said dog 15 engaging the inclined edges 20a, 20b of cam 20. The actuation of this cam 20 by dog 15 takes place along a dog stroke slightly longer than that causing the rotation of the disk 13, for the purpose of eliminating any risk of jamming the parts. The pivotal movement of cam 20 is limited by an elongated aperture formed in this cam about the pivot pin 17.

From the foregoing, it appears clearly that this memory mechanism is substantially the equivalent of a Geneva wheel, but controlled by a movement of translation.

Figure 4:
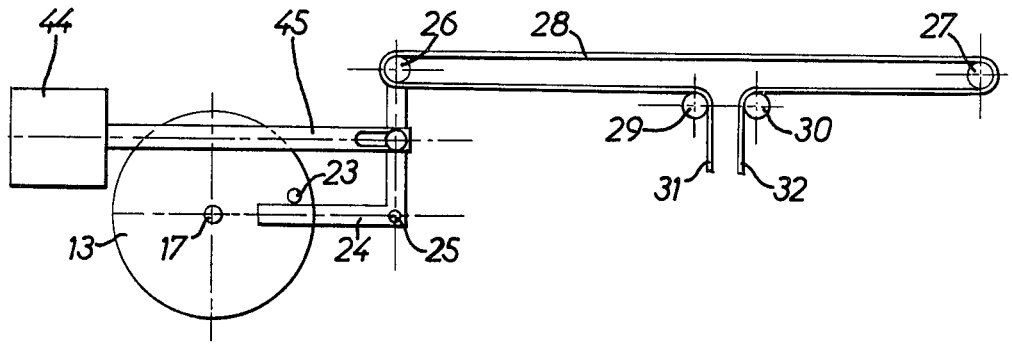
FIG. 4 illustrates the transmission of the movement from the memory mechanism to a pen retraction mechanism.

In FIG. 4, it will be seen that the disk 13 carries on the other hand a pin 23 adapted, in one of the endmost positions of the disk 13, to actuate a bell-crank lever 24 fulcrumed at 25 to the arm 2. This lever 24 carries a movable pulley 26. Another pulley 27 is secured to the end of arm 2 adjacent the rail 10. A drive rope 28 passes over a pair of pulleys 26 and 27 and also over another pair of pulleys 29 and 30 carried by the carriage 4. The ends 31 and 32 of this rope 28 are attached to a lever fulcrumed to the carriage 4, as will be explained presently. When the disk 13 is rotated, the movable pulley 26 is moved away from the fixed pulley 27, thus shifting the rope anchor points 31 and 32.

On the other hand, whatever the position of disk 13, the carriage 4 is movable along its axis $y_1$, $y'_1$ without causing any movement of the rope anchor points 31 and 32.

Figure 5:
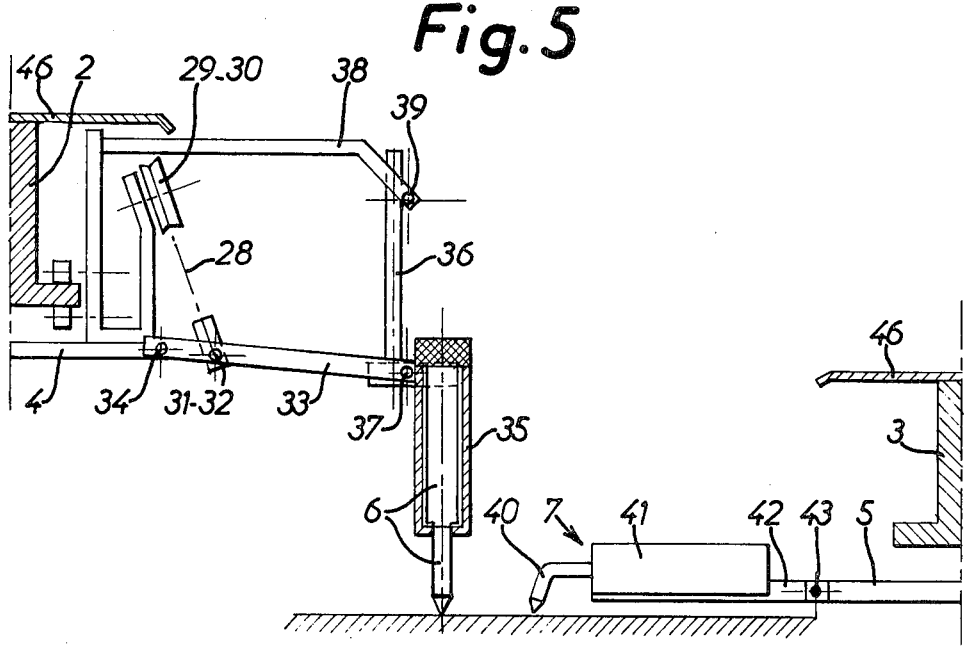
FIG. 5 illustrates a mechanism for retracting a pen carried by the upper arm, in the non-retracted position, as seen in side elevational view, together with one pen carried by the lower arm.

FIG. 5 also shows the pair of pulleys 29, 30 rigid with the carriage 4, the latter being shown only partially.

Figure 7:
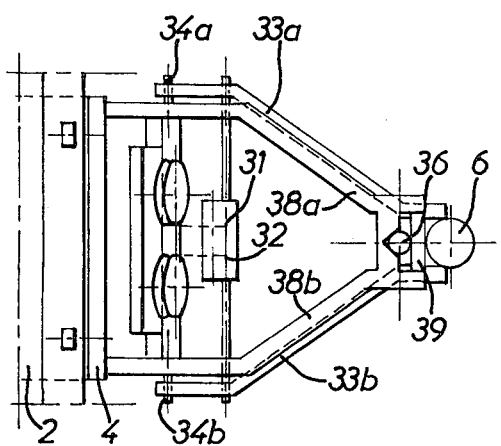
FIG. 7 illustrates an elevational view, with the casing removed, the retraction mechanism in the non-retracted position.

The ends of rope 28 are attached at 31 and 32 to a lever 33 fulcrumed to a pivot pin 34 carried by the carriage 4. This lever 33 consists in fact to two branches 33a, 33b each adapted to pivot about a guide pin 34a, 34b, respectively, as shown in FIG. 7, so that the lever 33 moves in a plane perpendicular to the axis $y_1$-$y'_1$ of arm 2.

The ink pen 6 is housed in a case 35 (shown in axial section in FIG. 5) rigid with a guide rod 36 parallel to the axis of pen 6. The case 35 is supported by means of a cross pin 37 rigid with the outer end of lever 33, and the guide rod 36 extends through an aperture formed through the end of an arm 38 rigid with the carriage 4 and overlying the lever 33, this arm 38 also comprising two side branches 38a and 38b (see FIG. 7). The aperture formed through the arm 38 consists preferably, on one side of guide rod 36, of a V-shaped notch formed in said arm 38 and having its adjacent faces perpendicular to the tracing plane 1 and located between the guide rod 36 and the axis $y_1$-$y'_1$ of the upper arm 2, and on the other side of the guide rod 34 of a transverse element 39 parallel to the axis $y_1$-$y'_1$ of the upper arm 2, and located slightly below the V-shaped notch, towards the plane 1.

Figure 6:
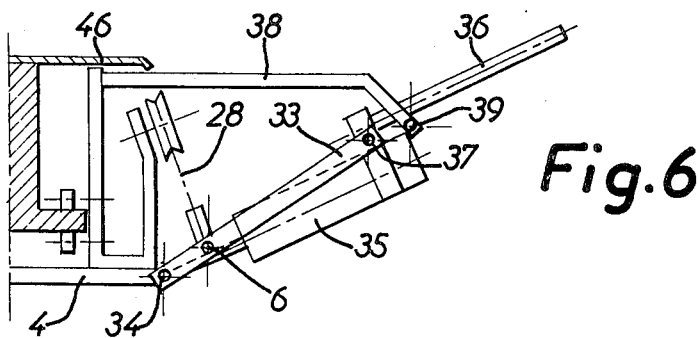
FIG. 6 illustrates the same retraction mechanism as seen in side elevational view in its retracted position.

When a traction is exerted on the control rope 28, the movement obtained for retracting the ink pen 6 is shown in FIG. 6: the lever 33 pivots about its pivot point 34, the case 35 pivots about its pivot point 37 movable in turn about pivot point 34, and guide rod 36 slides through the aperture of arm 38 to take an inclined position. In the retracted position, the ink pen 6 does not protrude beneath the upper arm 2.

Therefore, the retraction movement takes place by causing the case 35 to move towards the axis $y_1$-$y'_1$, i,e, away from the lower arm's body.

On the other hand, the return movement of the ink pen 6 to its tracing position is substantially a movement of translation perpendicular to the tracing plane 1, so that the line traced by the pen is not influenced by possible tolerances in the position of arm 2 above the plane 1.

Finally, the shape of the aperture formed in the arm 38 is such that friction efforts between the guide rod 36 and this aperture develop only when the pen 6 approaches its tracing position, the latter being determined with precision.

Preferably, the pivot pins 34a and 34b are mounted on the carriage 4 through hinge means movable in case of a shock directed towards the axis $y_1$-$y'_1$. Thus, for instance, the corresponding bearings (not shown) may be U-shaped with their apertures directed towards said axis $y_1$-$y'_1$, this aperture being normally bridged by an element adapted to yield or retract when a shock is applied thereto. Thus, in case of faulty operation of the means controlling the retraction during the crossing of the two arms, no damage can occur to the component elements.

On the right-hand portion of FIG. 5, it will be seen that the ink pen consists of a bent point 40 having its end portion directed towards the surface of the tracing plane 1, and of an ink reservoir 41 having its axis parallel to said plane 1 disposed at a minimum height above this plane.

This pen 7 is carried by a lever 42 pivoted to a pin 43 rigid with the carriage 5.

A rope and pulley control system similar to the one associated with the upper arm 2 is provided for lifting the pen 7 to the limited extent just necessary for discontinuing the tracing operation proper.

Reverting to the left-hand portion of FIG. 5, it will be seen that it also possible to control the lifting of ink pen 6 to a limited extent by means of said control rope 28, by simply giving this control system a smaller amplitude than that necessary for producing the retraction proper. Referring to FIG. 4, it will be seen that this control action may be accomplished by means of an electromagnet 44 controlling a lever 45 so as to slightly rotate the lever 24 without interfering with a possible retraction movement.

Preferably, this system for controlling the lifting of pen 6 has an amplitude such that the raised pen 6 can move over and clear of the reservoir 41 of pen 7, without contacting it. Thus, when the axes $y_1$-$y'_1$ and $y_2$-$y'_2$ are very close to each other without however entailing the actuation of the retraction system of pen 6, and when the difference between the ordinates $y_2$-$y_1$ is caused to change its sign, the tracing will not be dicontinued except during the short time period necessary for allowing the pen 6 to pass clear over the pen 7.

This lifting of pen 6 may be controlled by a position analyzer for example a proximity detector detecting a sufficient distance between pens 6 and 7.

However, a simpler method consists in making a comparison between the electric voltages proportional to the pen coordinates. Thus, the use of friction contacts that would be required for transmitting the output signal of a proximity detector associated with a pen can be dispensed with.

A protection plate 46 shown in part-sectional view in FIGS. 5 and 6 is mounted above each arm for protecting: the control rope 28, the tape (not shown) controlling the carriage movement and the potentiometer (also not shown) constituting the servo-control means associated with the carriage.

Of course, various modifications and improvements may be contemplated and brought to the form of embodiment described and illustrated herein, without departing however from the basic principles of the invention.

Thus, more particularly, the two ink pens of the upper arm may use one colour, and the other pair of pens attached to the lower arm may trace lines of a different colour, so that each diagram or chart can be identified without resorting to any particular device.

What is claimed as new is:

1. A tracing table for simultaneously tracing two independent paths on a same tracing plane, of the type comprising a tracing plane, two arms parallel to each other and to said tracing plane, said arms being disposed on a same side of said tracing plane and movable in a direction X of the tracing plane while remaining parallel to another direction Y of said plane, a carriage movable along each arm, a tracing pen carried by each carriage, and a pen lifting mechanism carried by each arm for raising the corresponding pen to a limited extent, wherein one of said arms referred to herein as the upper arm is mounted for movement in a plane located above the other arm, referred to as the lower arm, with respect to said tracing plane, said upper arm comprising, in addition to said pen lifting mechanism, a pen retraction mechanism capable of retracting the tracing pen of said upper arm up to a level higher than that of said lower arm, and control means connected to said retraction mechanism for actuating same to retract the tracing pen of said upper arm up to said higher level when said upper and lower arms are in a crossing condition, whereby said two arms can cross each other.

2. A tracing table as claimed in claim 1, wherein each arm comprises two tracing pens disposed on either side of the longitudinal axis of the arm concerned so as to project therefrom, and the two pens are mounted on the carriage of the relevant arm and at the same ordinate, the two pens being not simultaneously in operation, each pen of said upper arm having a corresponding retraction mechanism and a corresponding control means associated therewith.

3. A tracing table as claimed in claim 2, wherein a pen lifting mechanism is associated with each pen of each arm, and the pen lifting mechanisms of the upper arm are capable of raising the pens associated therewith to a level higher than that of the pens of said lower arm.

4. A tracing table as claimed in claim 2, wherein said retraction mechanism comprises two hinged levers and a link-motion, the first lever being substantially parallel to said tracing plane in the non-retracted position and adapted to pivot about a pivot pin carried by said carriage, said second lever pivoting about a pivot pin carried by said first lever and consisting of a case supporting the ink pen, and of a guide rod slidably engaging an aperture formed in an arm rigid with said carriage and overlying said first lever, said guide rod and the pen axis extending substantially at right angles to the tracing plane in the non-retracted position.

5. A tracing table as claimed in claim 4, wherein said pivot pin carried by said carriage for pivoting said first lever is parallel to the longitudinal axis of the upper arm.

6. A tracing table as claimed in claim 4, wherein said aperture in said arm consists, on one side of said guide rod, of a V-shaped notch having adjacent faces perpendicular to said tracing plane and located between said guide rod and the longitudinal axis of said arm, and on the other side of said guide rod, of a transverse element parallel to the axis of said arm and located at a level slightly lower than that of said V-shaped notch in the direction of said tracing plane.

7. A tracing table as claimed in claim 4, wherein each said control means comprises a memory device carried by said upper arm and including a detent positioning disk rotatably mounted on said upper arm adjacent one end thereof and having a notch formed in its outer periphery, and a dog rigid with said lower arm and movable therewith along a path secant to said disk, engagement of said dog with said notch causing said disk to rotate on one fraction of a revolution, the memory of the angular position of said disk being preserved, when said dog is released from said notch, by a stud engageable in one of two other notches formed in said disk, said stud being carried by a cam adapted to be moved against the force of a return spring by said dog, said cam actuation occuring for a stroke of said dog slightly in excess of the stroke of said dog which is necessary for rotating said disk.

8. A tracing table as claimed in claim 7, wherein said retraction mechanism further comprises a bell-crank lever fulcrumed to said upper arm adjacent said disk and having one arm engageable by a pin carried by said disk and another arm, a first pulley mounted on said other arm of said bell-crank lever, a second pulley mounted on the other end of said upper arm, a pair of pulleys mounted on the carriage, and a drive rope passing over said first and second pulleys and said pair of pulleys and having its ends attached to said first lever of said retraction mechanism.

9. A tracing table as claimed in claim 8, wherein the pen lifting mechanism associated with the pen of the upper arm comprises an electromagnet mechanically connected to said other arm of said bell-crank lever.

* * * * *